United States Patent
Won et al.

(10) Patent No.: US 11,888,934 B2
(45) Date of Patent: Jan. 30, 2024

(54) DEVICE AND METHOD FOR SYNCHRONIZING DATA IN REAL TIME BETWEEN DATA HUBS

(71) Applicant: Electronics and Telecommunications Research Institute, Daejeon (KR)

(72) Inventors: Hee Sun Won, Daejeon (KR); Chan Hyun Youn, Daejeon (KR); Seong Hwan Kim, Daejeon (KR); Ji Hwan Kim, Daejeon (KR); Eun Ju Yang, Daejeon (KR); Jeong Won Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/308,158

(22) Filed: Apr. 27, 2023

(65) Prior Publication Data
US 2023/0353634 A1 Nov. 2, 2023

(30) Foreign Application Priority Data
Apr. 27, 2022 (KR) .................. 10-2022-0052044

(51) Int. Cl.
*H04L 67/1095* (2022.01)
*H04L 67/141* (2022.01)

(52) U.S. Cl.
CPC ........ *H04L 67/1095* (2013.01); *H04L 67/141* (2013.01)

(58) Field of Classification Search
None
See application file for complete search history.

(56) References Cited

U.S. PATENT DOCUMENTS

| | | | |
|---|---|---|---|
| 7,555,303 B2 * | 6/2009 | Sutinen | G06F 16/275 709/217 |
| 7,747,760 B2 * | 6/2010 | Amra | H04L 67/1095 706/62 |
| 9,882,724 B2 | 1/2018 | Hyun et al. | |
| 10,027,748 B2 * | 7/2018 | Annamalai | G06F 16/27 |
| 11,290,438 B2 * | 3/2022 | Mathew | H04L 67/14 |
| 2018/0019877 A1 | 1/2018 | Koo | |

FOREIGN PATENT DOCUMENTS

| | | |
|---|---|---|
| KR | 10-0937163 | 1/2010 |
| KR | 10-2016-0108286 | 9/2016 |
| KR | 10-2021-0091416 | 7/2021 |
| KR | 10-2021-0103790 | 8/2021 |

\* cited by examiner

*Primary Examiner* — Backhean Tiv
(74) *Attorney, Agent, or Firm* — KILE PARK REED & HOUTTEMAN PLLC

(57) ABSTRACT

Provided are a device and method for synchronizing data between hubs in real time. The method includes verifying a session interworking environment, deriving session negotiation candidates, generating a session negotiation protocol message, transmitting a session negotiation request signal including the generated session negotiation protocol message to a second data hub, receiving a session negotiation settlement signal corresponding to the session negotiation request signal from the second data hub, generating a session module on the basis of the session negotiation settlement signal, and transmitting a session negotiation settlement signal to the second data hub.

20 Claims, 10 Drawing Sheets

| | FIELD | DATA TYPE | DESCRIPTION |
|---|---|---|---|
| SESSION MESSAGE SPECIFICATIONS | SESSION GENERATOR | CHARACTER STRING | ID OF DATA HUB SENDING SESSION REQUEST |
| | SESSION ID | CHARACTER STRING | SESSION IDENTIFIER |

710

| | FIELD | DATA TYPE | DESCRIPTION |
|---|---|---|---|
| SESSION MESSAGE SPECIFICATIONS | ISSUED DATA DOMAIN | CHARACTER STRING | DOMAIN OF DATA ISSUED UPON USER REQUEST OR BY DATA HUB |
| | DATA CATALOG SYNTAX | CHARACTER STRING | DATA CATALOG SYNTAX |

720

| | FIELD | DATA TYPE | DESCRIPTION |
|---|---|---|---|
| SYNCHRONIZATION MESSAGE SPECIFICATIONS | SYNCHRONIZATION INTERVALS (NUMBER OF CHANGES) | INTEGER | SYNCHRONIZATION INTERVALS ACCORDING TO THE NUMBER OF DATA CHANGE EVENTS |
| | SYNCHRONIZATION INTERVALS (PERIOD OF TIME) | INTEGER | SYNCHRONIZATION INTERVALS OVER TIME |
| | TRANSMISSION INTERFACE | CHARACTER STRING | DATA TRANSMISSION INTERFACE |

730

| | FIELD | DATA TYPE | DESCRIPTION |
|---|---|---|---|
| ENDPOINT MESSAGE SPECIFICATIONS | SESSION MODULE IP ADDRESS | CHARACTER STRING | IP ADDRESS OF SESSION MODULE TO INTERWORK WITH AFTER SESSION NEGOTIATION |
| | SESSION MODULE PORT | INTEGER | PORT OF SESSION MODULE TO INTERWORK WITH AFTER SESSION NEGOTIATION |

740

DEVICE AND METHOD FOR SYNCHRONIZING DATA IN REAL TIME BETWEEN DATA HUBS

CROSS-REFERENCE TO RELATED APPLICATION

This application claims priority to and the benefit of Korean Patent Application No. 10-2022-0052044, filed on Apr. 27, 2022, the disclosure of which is incorporated herein by reference in its entirety.

BACKGROUND

1. Field of the Invention

The present disclosure relates to a system and method for synchronizing data among multiple data hubs in real time, and more specifically, to a device and method for synchronizing data among multiple data hubs in real time in an open data ecosystem.

2. Discussion of Related Art

Lately, with the development of computing and information technology, big data has appeared due to the explosive increase in data, diversification of data types, and shorter data utilization cycles. Transformation is being made into a data-centered society in which new value is created through big data analysis based on existing statistical techniques, new artificial intelligence (AI) technologies, etc. Accordingly, as data draws attention as a new type of asset, the concept of data economy, a new ecosystem based on data distribution, has emerged, and open data platforms are expanding and being developed as data sharing and utilization solutions for effectively registering and managing large amounts of public data owned by public and private institutions and using the large amounts of public data in connection with data of other institutions.

Such an open data platform provides data registration, publication, and search functions for the convenience of data sharing and utilization among data hubs that own open data. The data registration function supports data upload and storage functions for data sharing by a data hub that owns data, a function of defining a file format of data to be registered, etc., and the data publication function supports a management function of publishing registered data according to data catalog syntax supported by the open data platform, providing security and standardization for data publication, etc. The data search function supports a function of searching for desired data on the basis of a data catalog containing data sources, classifications, content, etc. issued by multiple data hubs for smooth use of data by data hub users and administrators. After that, when the desired data is found, the data of a data hub that issued the data is copied and utilized locally using a data harvesting function.

However, with the spread of open data platform technology, many countries and organizations are developing open data platforms according to individual purposes and environments. Accordingly, there are difficulties in interworking for data synchronization among data hubs with different interworking environments, such as not being able to smoothly share metadata between open data platforms by publishing data using different types of data catalog syntax, not being able to transmit data due to differences in supported transmission interfaces, etc.

Meanwhile, a session is a technology for recognizing a series of requests coming from the same user for a certain period of time on an Internet web browser as one state and managing user information, referring to a state of a conversation or transmission and reception connection between two or more communication devices or computers which are semi-permanent and presuppose interactive information exchange. Sessions interwork with each other and are managed to provide a service between a sender and a receiver. When a user uses a service provided by a web server through a web browser, user and activity information may be stored in the web server rather than a user memory, and only a session key value may be left in the web browser of the user so that a semi-permanent and interactive service can be provided through authentication of a session key value.

Fundamental technologies of a session include the session description protocol (SDP), the session initiation protocol (SIP), etc. for negotiating about interworking environments, such as data and transmission specifications and the like, in an initial process of causing sessions of a sender and a receiver to interwork with each other. The SDP and the SIP are session negotiation protocols that are mainly used in a media streaming service to negotiate mutually supported media types, specifications, etc. for determining whether session interworking is possible to transmit media data in real time for media streaming between a server and a client. These protocols are application-level signaling protocols that specify a procedure for intelligent terminals which try to communicate on the Internet to identify each other, detect each other's locations, and establish, delete, or change a communication session therebetween, and a sender and receiver exchange text messages. Actual content of an established session is described to generally include one or more media formats, such as audio, video, text, etc., in a message, although these are not provided as the content of a media form. Accordingly, a means for negotiating a media type and format is provided.

However, according to the related art, since data hubs are run in various countries and organizations according to individual purposes and environment, there are many data hubs with different interworking environments, and it is an unclear which data hubs are synchronizable through session interworking such as non-smooth data sharing between data hubs due to data issued using different types of data catalog syntax and impossible data transmission due to different supported transmission interfaces. Accordingly, users suffer inconvenience.

SUMMARY OF THE INVENTION

The present disclosure is directed to providing an active synchronization structure that establishes a synchronization session between a data hub issuing data and a data hub subscribing to data and transmits data to the data hub subscribing to data at synchronization intervals negotiated therebetween when data is changed in the data hub owning the data.

The present disclosure is also directed to providing a data synchronization negotiation protocol for exchanging, in the case of session interworking for data synchronization between data hubs, issued domain information and information on users' data domains of interest between the data hubs, and negotiating interworking environment information such as data catalog syntax and supported transmission interfaces, and message specifications thereof.

Other objectives and advantages of the present disclosure can be appreciated from the following description and clearly understood through exemplary embodiments of the present disclosure. Also, it will be easily understood that objectives and advantages of the present disclosure can be achieved by means stated in the claims and combinations thereof.

According to an aspect of the present disclosure, there is provided a method of synchronizing data between data hubs in real time by a first data hub, the method including verifying a session interworking environment, deriving session negotiation candidates, generating a session negotiation protocol message, transmitting a session negotiation request signal including the generated session negotiation protocol message to a second data hub, receiving a session negotiation settlement signal corresponding to the session negotiation request signal from the second data hub, generating a session module on the basis of the session negotiation settlement signal, and transmitting a session negotiation settlement signal to the second data hub.

The method may further include receiving a session negotiation rejection signal from the second data hub.

The generating of the session negotiation protocol message may further include generating the session negotiation protocol message on the basis of at least one of domain list information, data catalog syntax, synchronization intervals, and interworking environment information of a supported transmission interface.

The method may further include, when the number of sessions is less than a maximum number of sessions, selecting a data hub from among the session negotiation candidates and transmitting the session negotiation request signal to the data hub.

The method may further include, when the session negotiation request signal is received, checking the number of sessions, when the number of sessions is less than a maximum number of sessions, determining whether an interworking environment session negotiation is possible, when an interworking environment session negotiation is possible, generating a session module, and transmitting the session negotiation settlement signal to the first data hub.

The method may further include running a synchronization session server and managing session interworking and session information.

The method may further include managing the session interworking and the session information using an endpoint of a session module of the second data hub.

The method may further include, when a data change is detected, extracting changed data and transmitting the changed data to the second data hub at synchronization intervals.

The method may further include extracting only a changed part of most recently transmitted data using session information.

The session negotiation request signal may include a header part and a body part, the header part may include an authentication key, and the body part may include session message specifications, data message specifications, and synchronization message specifications.

According to another aspect of the present disclosure, there is provided a device for synchronizing data between data hubs in real time, the device including a session negotiation environment verifier configured to verify a session interworking environment between a first data hub and a second data hub, a session negotiation candidate manager configured to derive session negotiation candidates, and a session negotiation request transmitter configured to generate a session negotiation protocol message, transmit a session negotiation request signal including the generated session negotiation protocol message to the second data hub, receive a session negotiation settlement signal corresponding to the session negotiation request signal from the second data hub, generate a session module on the basis of the session negotiation settlement signal, and transmit a session negotiation settlement signal to the second data hub.

The session negotiation request transmitter may receive a session negotiation rejection signal from the second data hub.

The session negotiation request transmitter may generate the session negotiation protocol message on the basis of at least one of domain list information, data catalog syntax, synchronization intervals, and interworking environment information of a supported transmission interface.

When the number of sessions is less than a maximum number of sessions, the session negotiation request transmitter may select a data hub from among the session negotiation candidates and transmit the session negotiation request signal to the data hub.

A session negotiation request transmitter may check the number of sessions when the session negotiation request signal is received, determine whether an interworking environment session negotiation is possible when the number of sessions is less than a maximum number of sessions, and generate a session module and transmit the session negotiation settlement signal to the first data hub when the interworking environment session negotiation is possible.

The session negotiation request transmitter may run a synchronization session server and manage session interworking and session information.

The session negotiation request transmitter may manage the session interworking and the session information using an endpoint of a session module of the second data hub.

The session negotiation request transmitter may extract, when a data change is detected, changed data and transmit the changed data to the second data hub at synchronization intervals.

The session negotiation request transmitter may extract only a changed part of most recently transmitted data using session information.

According to another aspect of the present disclosure, there is provided a device for synchronizing data between data hubs in real time, the device including a transceiver configured to transmit and receive data to and from an external device and a processor configured to verify a session interworking environment between a first data hub and a second data hub, derive session negotiation candidates, generate a session negotiation protocol message, transmit a session negotiation request signal including the generated session negotiation protocol message to the second data hub through the transceiver, receive a session negotiation settlement signal corresponding to the session negotiation request signal from the second data hub, generate a session module on the basis of the session negotiation settlement signal, and transmit a session negotiation settlement signal to the second data hub.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 7 is a diagram illustrating message specifications for data synchronization according to an exemplary embodiment of the present disclosure;

DETAILED DESCRIPTION OF EXEMPLARY EMBODIMENTS

Figure 1:
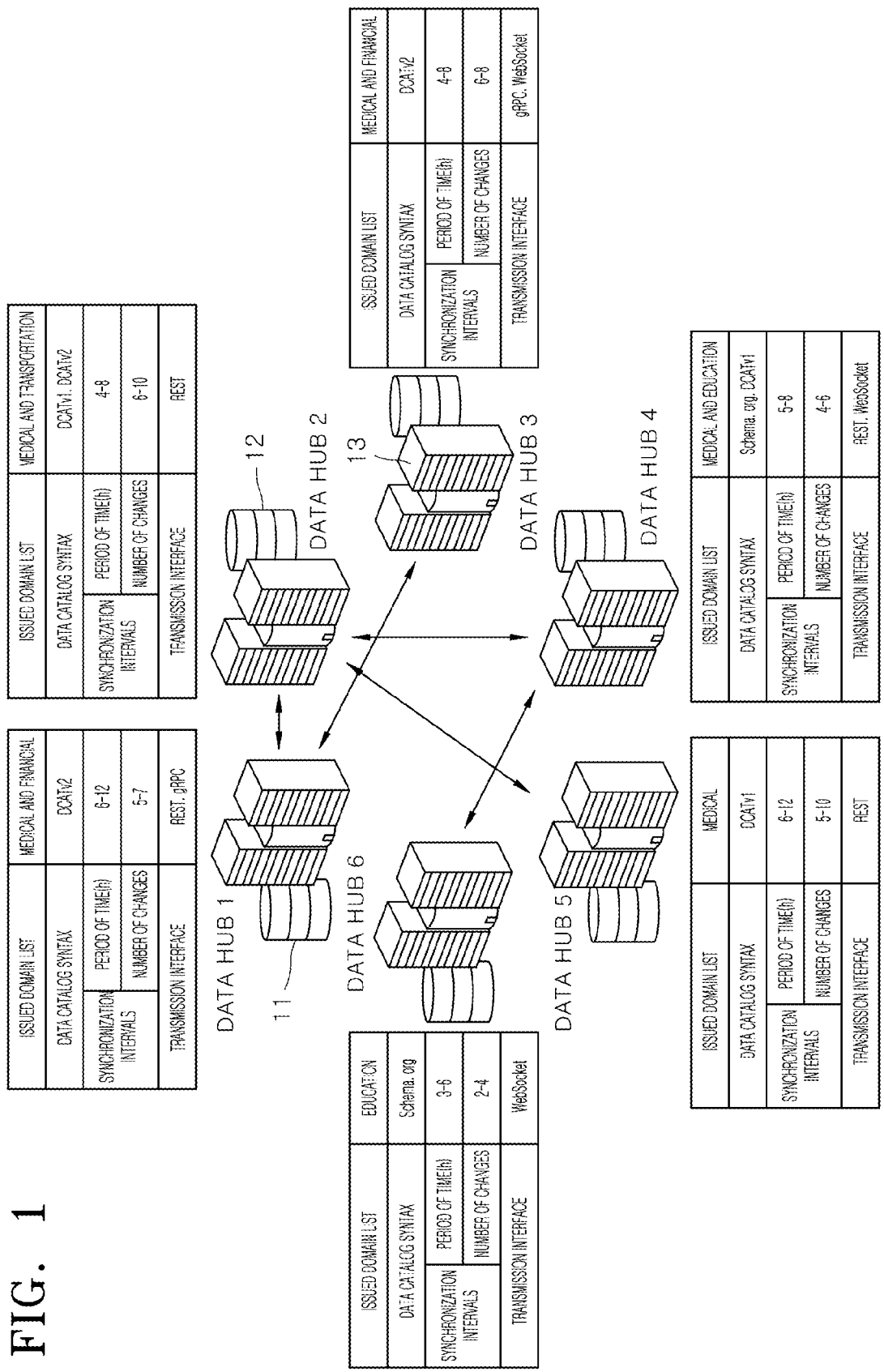
FIG. 1 is a diagram illustrating a session interworking scenario for synchronizing data in real time among multiple data hubs in an open data ecosystem according to an exemplary embodiment of the present disclosure.

Hereinafter, exemplary embodiments of the present disclosure will be described in detail with reference to the accompanying drawings so that those of ordinary skill in the art may easily implement the present disclosure. However, the present disclosure may be implemented in a variety of different forms and is not limited to the exemplary embodiments described herein.

In describing the present disclosure, when it is determined that a detailed description of a well-known element or function may obscure the gist of the present disclosure, the detailed description will be omitted. Throughout the drawings, parts irrelevant to description of the present disclosure will be omitted, and like reference numerals refer to like elements.

In the present disclosure, elements that are distinguished from each other are intended to clearly illustrate each feature, but it does not necessarily mean that the elements are separate. In other words, a plurality of elements may be integrated into one hardware or software unit, or a single element may be distributed into a plurality of hardware or software units. Accordingly, unless otherwise noted, embodiments including such integrated or distributed elements also fall under the scope of the present disclosure.

In the present disclosure, elements described in various embodiments are not necessarily essential elements, and some may be optional elements. Accordingly, embodiments including a subset of elements described in one embodiment also fall under the scope of the present disclosure. Also, embodiments that include other elements in addition to elements described in various embodiments also fall under the scope of the present disclosure.

In the present disclosure, terms such as "first," "second," etc. may be only used for the purpose of distinguishing one element from another and do not limit the order, importance, etc. of elements unless particularly described. Accordingly, within the scope of the present disclosure, a first element in one embodiment may be referred to as a second element in another embodiment, and similarly, a second element in one embodiment may be referred to as a first element in another embodiment.

In this specification, when an element is described as being "connected" or "coupled" to another element, it may be directly connected or coupled to another element, or still another element may be present therebetween. On the other hand, when an element is described as being "directly connected" or "directly coupled" to another element, there is no other element therebetween.

In addition, in the present disclosure, description of each drawing may be applied to different drawings unless one drawing illustrating an embodiment of the present disclosure corresponds to an alternative embodiment in another drawing.

The present disclosure will be described in further detail below with reference to the accompanying drawings.

FIG. 1 is a diagram illustrating a session interworking scenario for synchronizing data in real time among multiple data hubs in an open data ecosystem according to an exemplary embodiment of the present disclosure.

As shown in FIG. 1, for session interworking for data synchronization with other data hubs, each data hub generates a session negotiation protocol message through domain list information being issued and interworking environment information, such as data catalog syntax, synchronization intervals (the period of time and the number of changes), a supported transmission interface, etc., and causes a real-time data synchronization session to interwork through mutual session negotiation logic.

Now, a session interworking situation of a first data hub 11 will be described according to the present embodiment. The first data hub 11 is in session interworking with a second data hub 12 and a third data hub 13. Together with the second data hub 12, the first data hub 11 generates a data catalog regarding a medical domain according to data catalog vocabulary version 2 (DCATv2) which is data catalog syntax, transmits changed data at synchronization intervals of 6 to 8 hours or every 6 or 7 changes, and uses representational state transfer (REST) as a transmission interface.

The first data hub 11 is also in session interworking with the third data hub 13 according to the same logic and is not in session interworking with other data hubs because a domain list being issued by the first data hub 11 and a user's domain of interest are different from those of other data hubs or the first data hub 11 has a different interworking environment from other data hubs.

Figure 2:
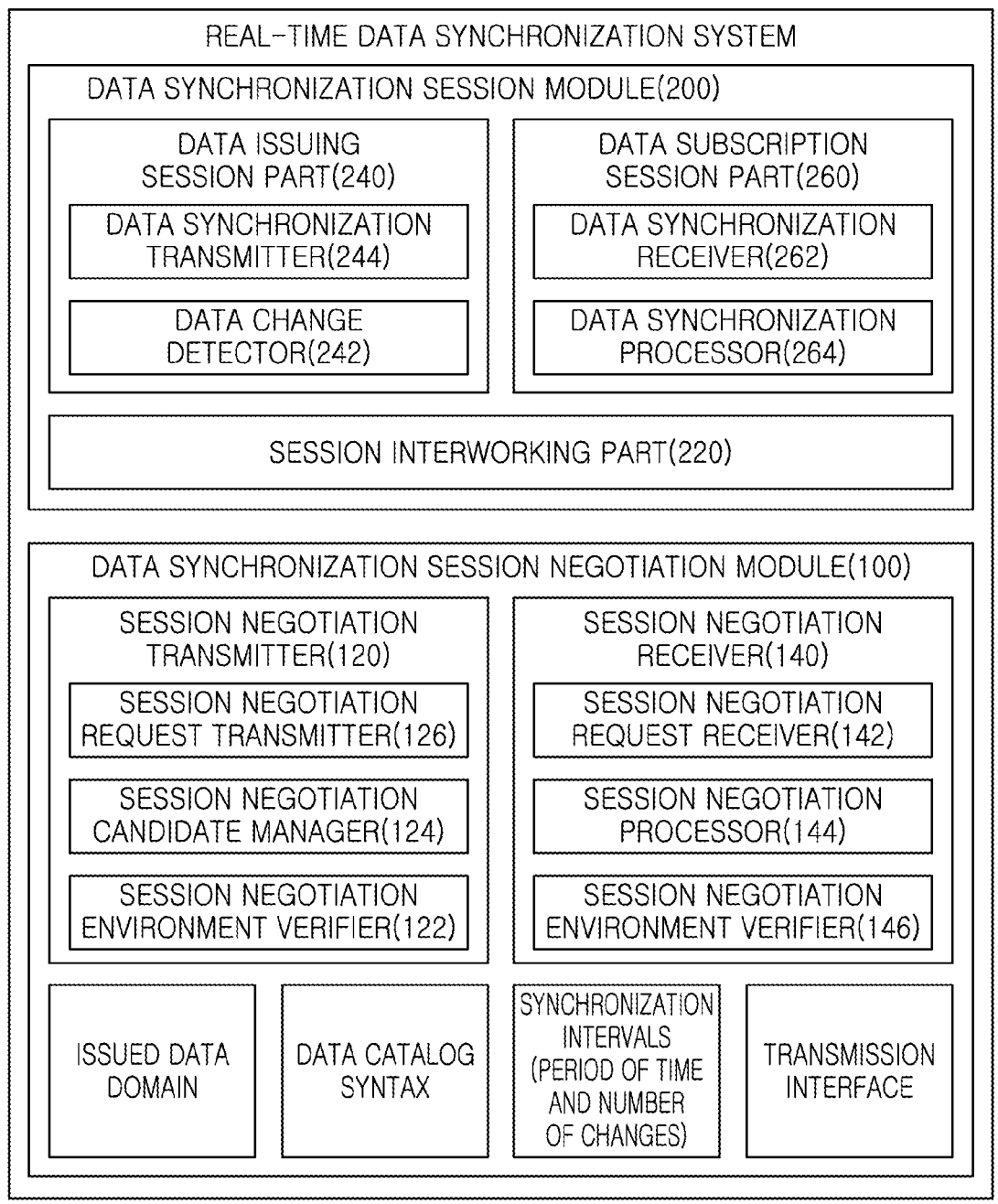
FIG. 2 is a block diagram of a system for synchronizing data in real time on the basis of a session according to an exemplary embodiment of the present disclosure.

FIG. 2 is a block diagram of a system for synchronizing data in real time on the basis of a session according to an exemplary embodiment of the present disclosure.

As shown in FIG. 2, a real-time data synchronization system 1000 includes a data synchronization session negotiation module 100 and a data synchronization session module 200.

The data synchronization session negotiation module 100 generates a session negotiation protocol message through domain list information being issued and interworking environment information, such as data catalog syntax, synchronization intervals (the period of time and the number of changes), a supported transmission interface, etc., and performs a mutual session negotiation.

The data synchronization session module 200 detects a data change after session interworking, transmits changed data to a counterpart session at negotiated synchronization intervals, and reflects the changed data.

Figure 3:
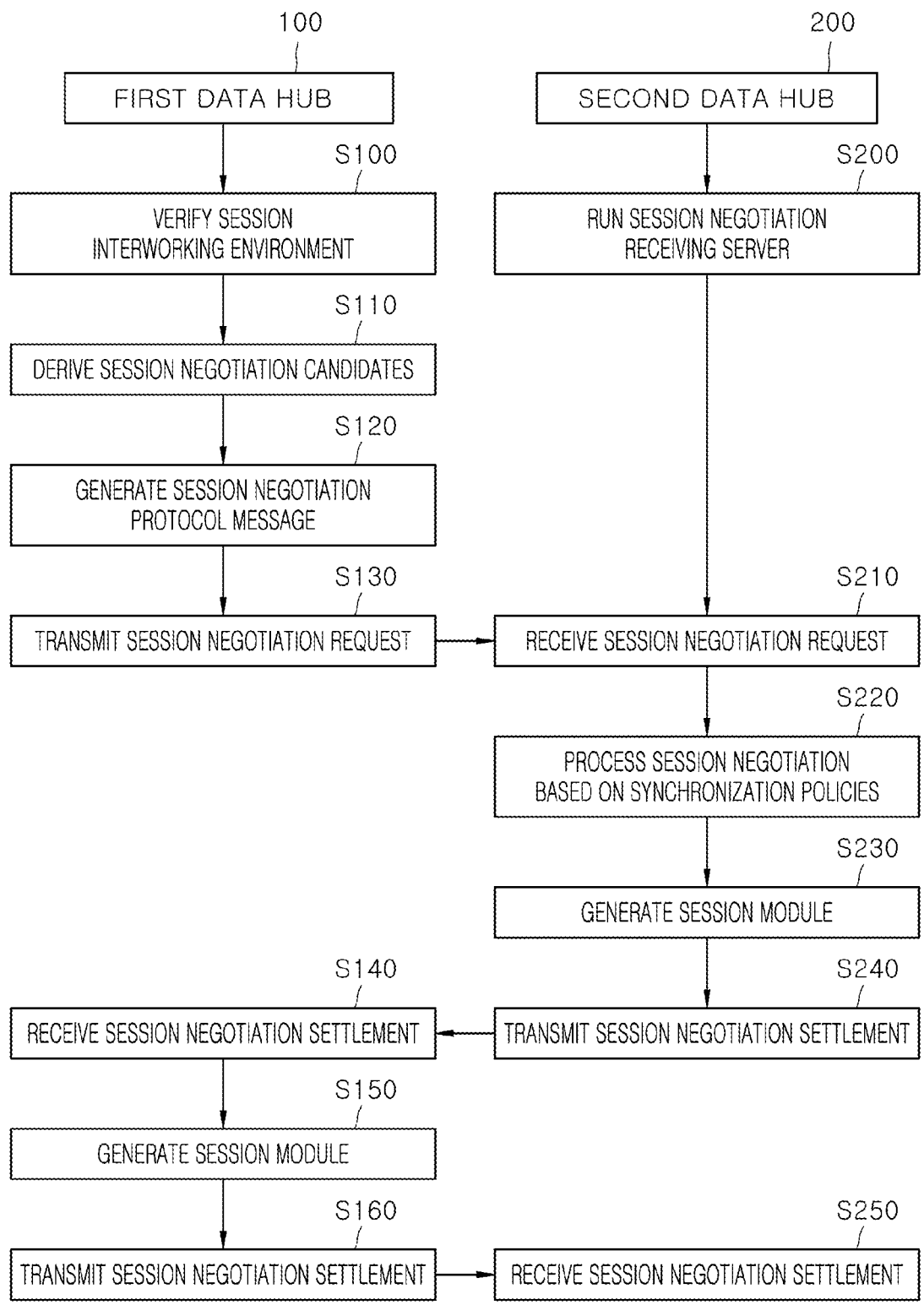
FIG. 3 is a sequence diagram illustrating a session negotiation settlement process between data synchronization session negotiation modules according to an exemplary embodiment of the present disclosure.
Figure 4:
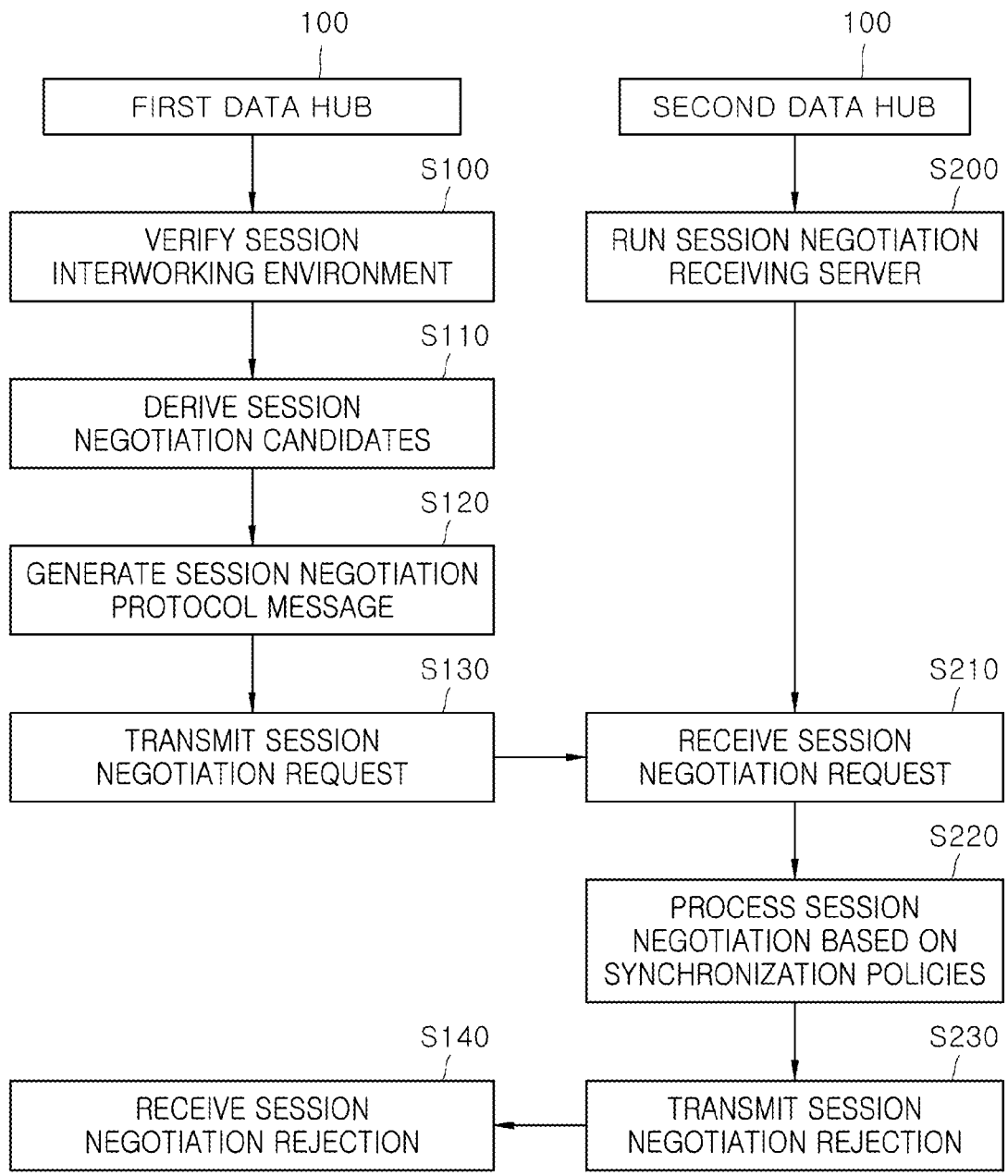
FIG. 4 is a sequence diagram illustrating a session negotiation rejection process between data synchronization session negotiation modules according to an exemplary embodiment of the present disclosure.

First, the data synchronization session negotiation module 100 determines whether to accept or reject session interworking through a process of performing a session negotiation between hubs as shown in FIGS. 3 and 4.

To this end, as individual processes, the data synchronization session negotiation module 100 runs a session negotiation transmitter 120 serving as a client which transmits a session negotiation request to another data hub, and a session negotiation receiver 140 serving as a server which receives and processes a session negotiation request transmitted by another data hub.

Figure 8:
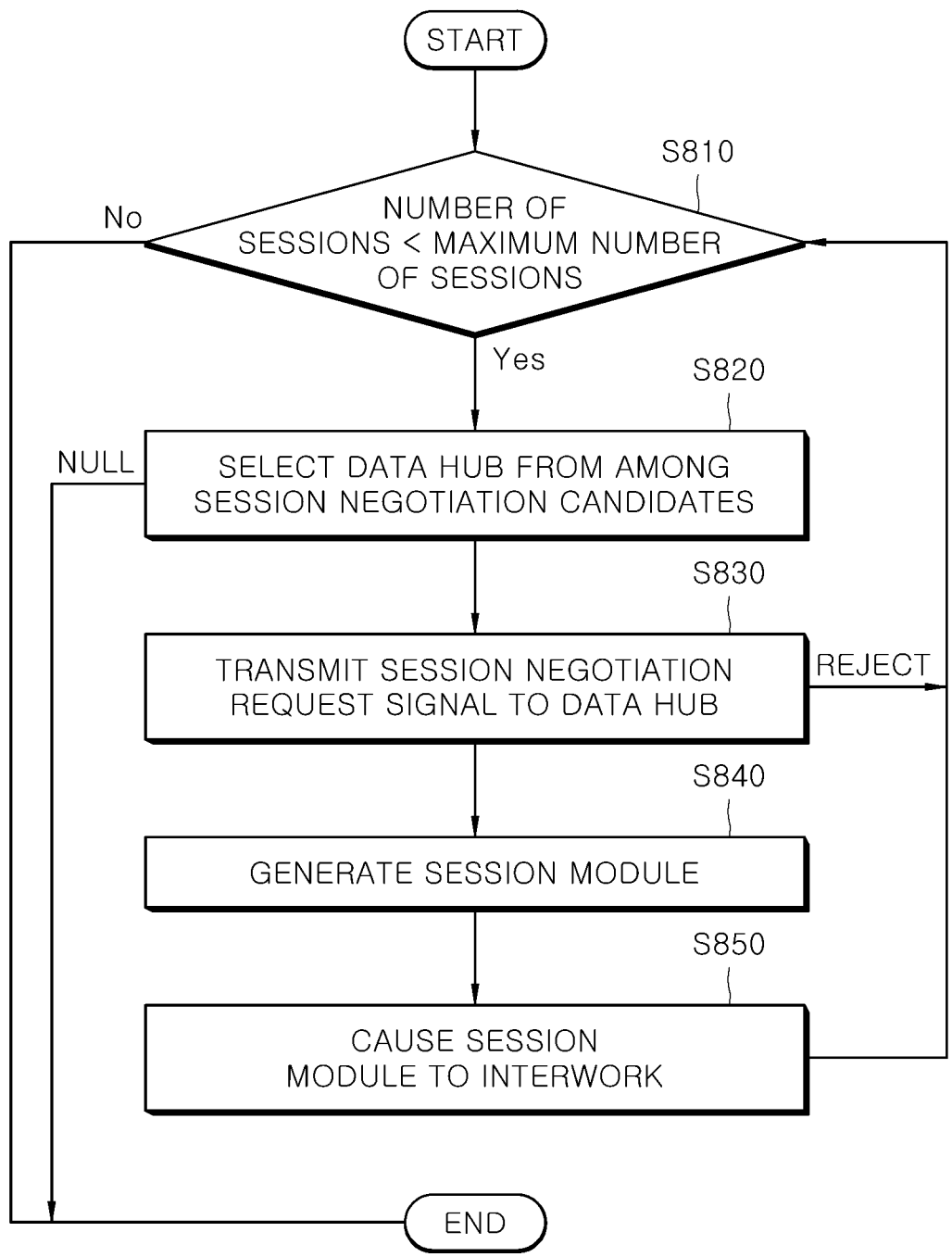
FIG. 8 is a flowchart illustrating a session negotiation process in a transmitter according to an exemplary embodiment of the present disclosure.

When the process is executed, the session negotiation transmitter 120 operates according to a process of determining whether additional session interworking is possible by comparing the limited maximum number of sessions with the number of currently interworking sessions and transmitting a session negotiation request to a data hub in a session negotiation candidate list as shown in FIG. 8.

The session negotiation transmitter 120 includes a session negotiation environment verifier 122, a session negotiation candidate manager 124, and a session negotiation request transmitter 126.

The session negotiation environment verifier 122 performs an operation S100 of determining whether additional session interworking is possible by comparing the maximum number of sessions with the number of currently interworking sessions.

The session negotiation candidate manager 124 performs an operation S110 of managing a session negotiation candidate data hub list by searching for data from distributed data hubs.

The session negotiation request transmitter 126 performs an operation S120 of generating a session negotiation protocol message of FIG. 8 for transmitting a session negotiation request to a session negotiation candidate data hub on the basis of a data synchronization session negotiation protocol of FIG. 7, an operation S130 of transmitting a session negotiation request to a session negotiation receiver 140 of the session negotiation candidate data hub, an operation S140 of receiving a session negotiation result (settlement or rejection), an operation S150 of generating a data synchronization session module 200 when the session negotiation is settled, and an operation S160 of transmitting information (endpoint) of the generated session module 200 to the counterpart data hub.

Figure 9:
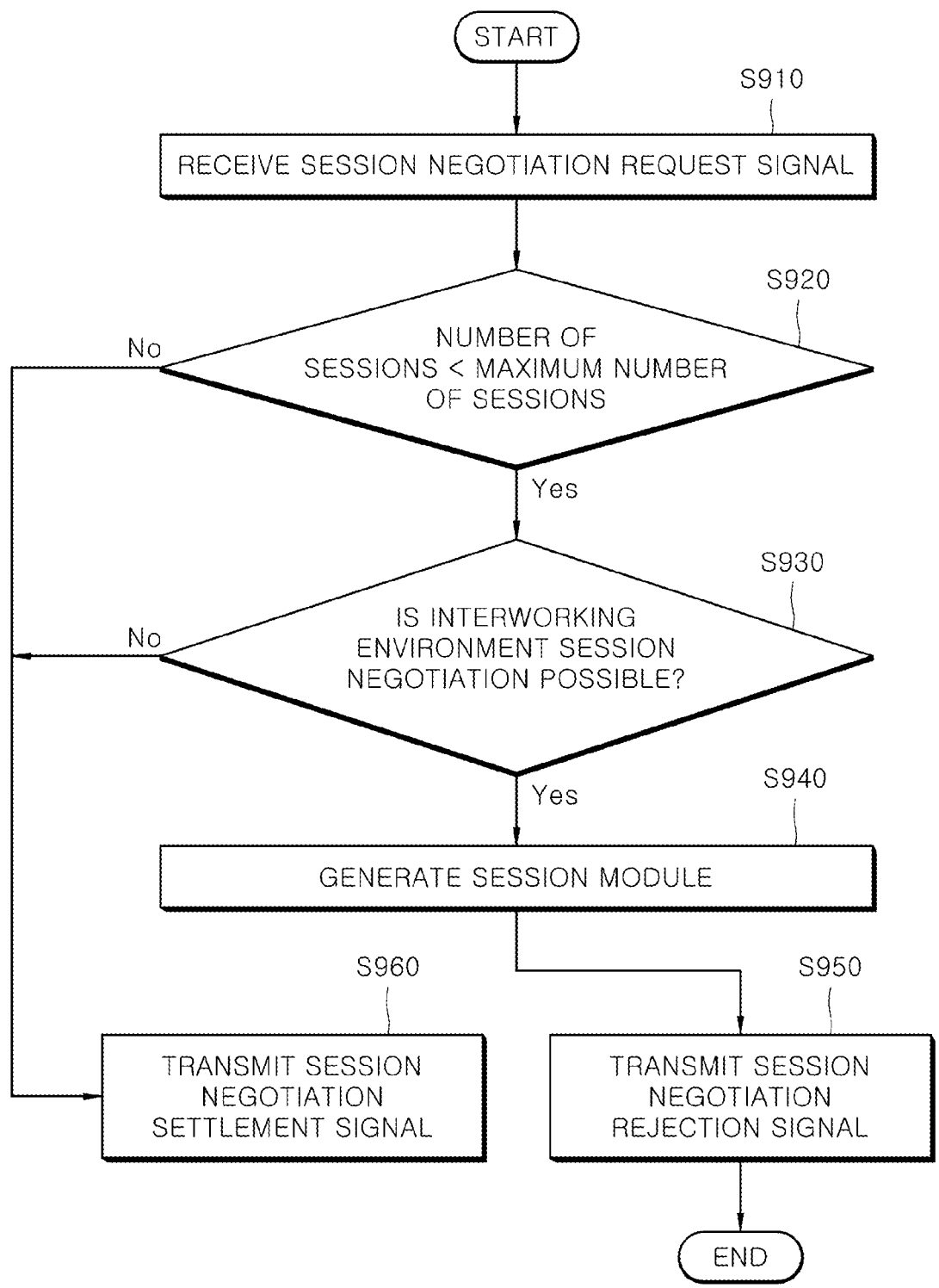
FIG. 9 is a flowchart illustrating a session negotiation process in a receiver according to an exemplary embodiment of the present disclosure.

When the process is executed, to process a received session negotiation request as illustrated in FIG. 9, the session negotiation receiver 140 operates according to a process of determining whether additional session interworking is possible by comparing the limited maximum number of sessions with the number of currently interworking sessions, negotiating whether session interworking for data synchronization is possible by comparing data domain information and interworking environment information between the data hubs, and transmitting a result of the negotiation.

The session negotiation receiver 140 includes a session negotiation request receiver 142, a session negotiation environment verifier 146, and a session negotiation processor 144.

The session negotiation request receiver 142 performs an operation S200 of running a server for receiving a session negotiation request, an operation S210 of receiving a session negotiation request, an operation S240 of transmitting a session negotiation result (settlement or rejection), and an operation S250 of receiving information (endpoint) of a session module of a counterpart data hub when the session negotiation is settled.

To process the received session negotiation request, the session negotiation environment verifier 146 performs an operation S220 of determining whether additional session interworking is possible by comparing the maximum number of sessions with the number of currently interworking sessions.

The session negotiation processor 144 performs an operation S230 of negotiating whether session interworking for data synchronization is possible by comparing the data domain information and the interworking environment information issued between the data hubs.

Figure 6:
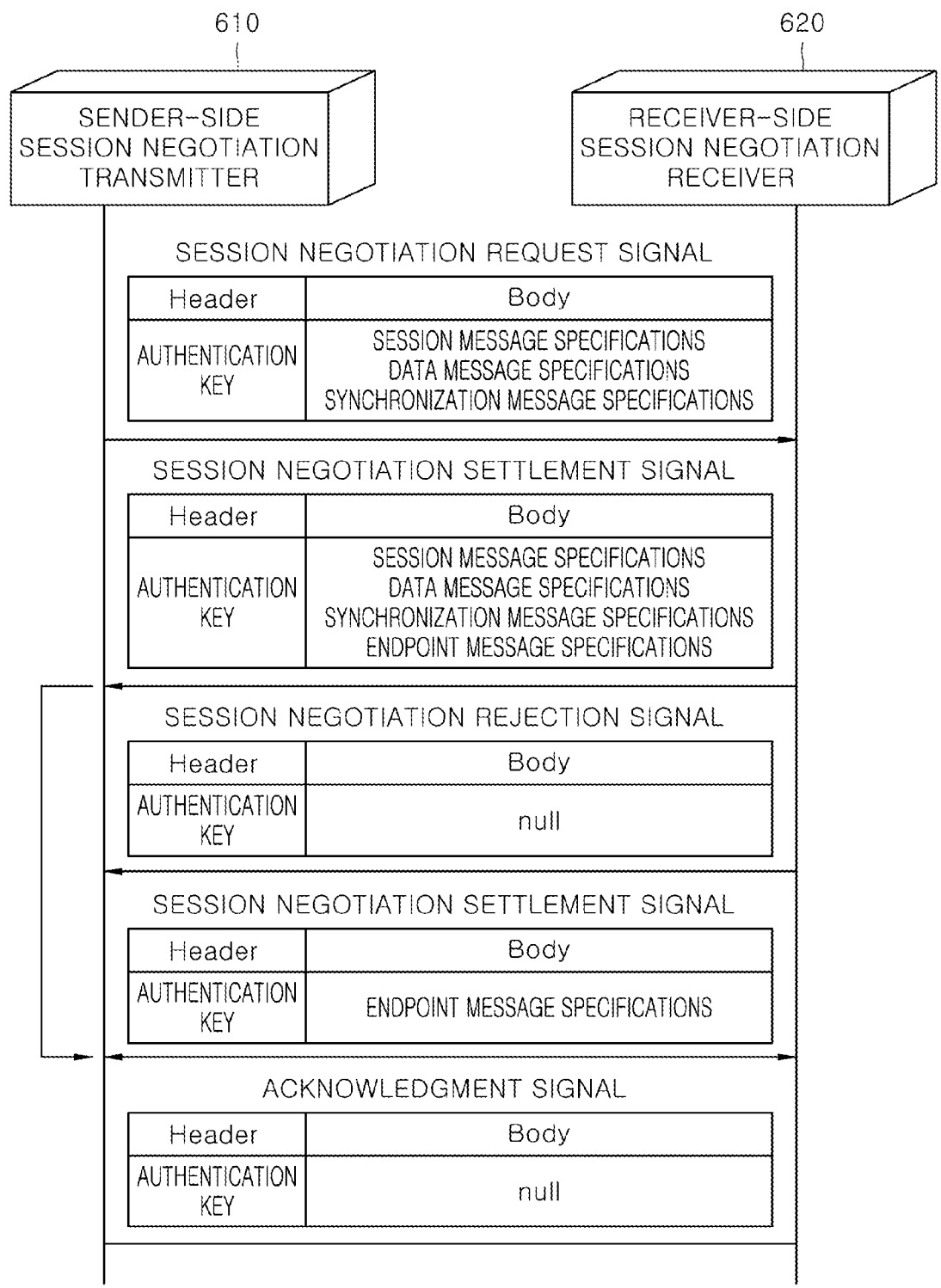
FIG. 6 is a sequence diagram illustrating a negotiation protocol for data synchronization according to an exemplary embodiment of the present disclosure.

As described above, the session negotiation process for session interworking between data hubs is performed by the session negotiation request transmitter 126 and the session negotiation request receiver 142, and communication is performed according to a session negotiation protocol of FIG. 6 and session negotiation protocol message specifications of FIG. 7.

Figure 5:
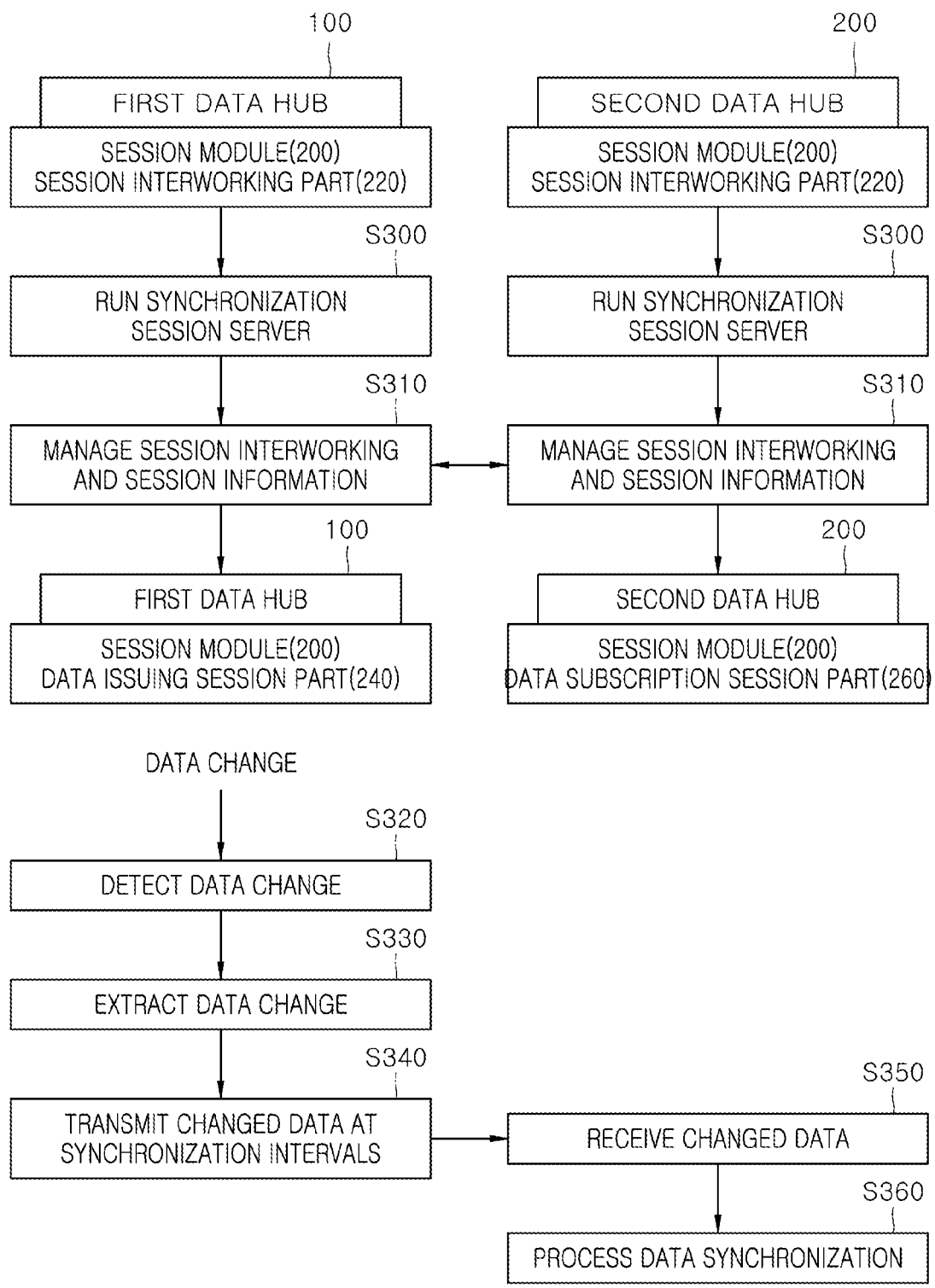
FIG. 5 is a sequence diagram illustrating a management process of data synchronization session modules after a session negotiation is settled according to an exemplary embodiment of the present disclosure.

As shown in FIG. 5, the data synchronization session module 200 runs a synchronization session server, causes session modules to interwork with each other using exchanged endpoints, and manages a counterpart session key value and session negotiation information. After that, the data synchronization session module 200 detects a data change, transmits the changed data to the counterpart session at negotiated synchronization intervals, and reflects the changed data.

To this end, the data synchronization session module 200 runs a session interworking part 220, a data issuing session part 240 for transmitting data issued by a data hub to a counterpart session, and a data subscription session part 260 for subscribing to data issued by the counterpart data hub, receiving data transmitted by the counterpart session, copying the data as local data, and performing a synchronization process.

When the data synchronization session module 200 is run, the session interworking part 220 performs an operation S300 of running synchronization session servers first. After that, when a session negotiation is settled between the data hubs by the data synchronization session negotiation module 100, the session interworking part 220 performs an operation S310 of performing session interworking and managing the counterpart session key value and the session negotiation information using the exchanged endpoint of the session module of the counterpart data hub.

The data issuing session part 240 includes a data change detector 242 and a data synchronization transmitter 244.

When data issued by the data hub is changed, the data change detector 242 synchronizes the changed data with the counterpart data hub.

When data issued by the data hub is changed, the data change detector 242 performs an operation S320 of detecting the data change and an operation S330 of extracting only changed parts from the most recently transmitted data using session information.

The data synchronization transmitter 244 performs an operation S340 of transmitting the changed data to the data synchronization receiver of the counterpart session module at synchronization intervals.

The data subscription session part 260 includes a data synchronization receiver 262 and a data synchronization processor 264.

The data synchronization receiver 262 performs an operation S350 of receiving changed data information from the session module of the interworking counterpart data hub.

The data synchronization processor 264 performs an operation S360 of copying the data as local data and performing a synchronization process for the changes in the data.

FIG. 3 is a sequence diagram illustrating a process of performing a session negotiation between data synchronization session negotiation modules according to an exemplary embodiment of the present disclosure.

A process of settling a session negotiation and performing session interworking between session modules when domain lists issued by both sides and users' domains of interest are identical and interworking environments are compatible with each other will be described with reference to FIG. 3. The present disclosure is performed by a first data hub 100 and a second data hub 200. Each of the first data hub 100 and the second data hub 200 includes a session negotiation module.

A session interworking environment is verified (S100).
Session negotiation candidates are derived (S110).
A session negotiation protocol message is generated (S120).
A session negotiation request signal including the generated session negotiation protocol message is transmitted to the second data hub (S130).
A session negotiation receiving server is run (S200).
The session negotiation request signal is received from the first data hub 100 (S210).
The session negotiation is processed on the basis of synchronization policies (S220).
A session module is generated (S230).
A session negotiation settlement signal is transmitted to the first data hub 100 (S240).
The session negotiation settlement signal corresponding to the session negotiation request signal is received from the second data hub 200 (S140).
A session module is generated on the basis of the session negotiation settlement signal (S150).
A session negotiation settlement signal is transmitted to the second data hub 200 (S160).
The second data hub 200 receives the session negotiation settlement signal from the first data hub 100 (S250).

FIG. 4 is a sequence diagram illustrating a process of performing a session negotiation between data synchronization session negotiation modules according to an exemplary embodiment of the present disclosure.

A process in which session interworking is not achieved when domain lists issued by both sides and users' domains of interest are not identical or interworking environments are not compatible with each other will be described with reference to FIG. 4. The present disclosure is performed by a first data hub 100 and a second data hub 200. Each of the first data hub 100 and the second data hub 200 includes a session negotiation module.

A session interworking environment is verified (S100).
Session negotiation candidates are derived (S110).
A session negotiation protocol message is generated (S120).
A session negotiation request signal including the generated session negotiation protocol message is transmitted to the second data hub (S130).
A session negotiation receiving server is run (S200).
The session negotiation request signal is received from the first data hub 100 (S210).

The session negotiation is processed on the basis of synchronization policies (S220).
A session negotiation rejection signal is transmitted to the first data hub 100 (S230).
The first data hub 100 receives the session negotiation rejection signal from the second data hub (S140).

FIG. 5 is a sequence diagram illustrating a management process of data synchronization session modules after a session negotiation is settled according to an exemplary embodiment of the present disclosure.

FIG. 5 illustrates a process in which, after a session negotiation is settled, a data synchronization session module manages session interworking, a counterpart session key value, and session negotiation information through an endpoint of a counterpart session, detects a data change thereafter, transmits changed data to the counterpart session at negotiated synchronization intervals, and reflects the changed data.

As shown in FIG. 5, the present disclosure is performed by a first data hub 100 and a second data hub 200.
The first data hub 100 includes a session module 200 and a session interworking part 220.
A synchronization session server is run (S300).
Session interworking and session information are managed (S310).
Here, session interworking and session information are managed using an endpoint of a session module of the second data hub 200.
The first data hub 100 and the second data hub 200 transmit and receive session interworking and session information to and from each other.
Next, a case in which there is a data change will be described.
The first data hub 100 includes the session module 200 and a data issuing session part 240.
The second data hub 200 includes a session module 200 and a data subscription session part 260.
When a data change is detected (S320), changed data is extracted (S330).
Specifically, only a changed part is extracted from the most recently transmitted data using session information.
The changed data is transmitted to the second data hub 200 at synchronization intervals (S340).
The second data hub 200 receives the changed data and performs data synchronization (S350).
Data synchronization is processed (S360).

FIG. 6 is a sequence diagram illustrating a negotiation protocol for data synchronization according to an exemplary embodiment of the present disclosure.

A sender-side session negotiation transmitter 610 transmits a session negotiation request signal to a receiver-side session negotiation receiver 620.

An authentication key is input to a message header and thereafter used for recognizing a sender and a receiver of the message transmitted and received in a mutual session negotiation process.

According to session negotiation protocol message specifications, session information, issued data domain information, synchronization information, and endpoint information are exchanged through a message body.

For example, the session negotiation request signal includes a header and a body.

The header includes an authentication key.

The body includes session message specifications, data message specifications, and synchronization message specifications.

Details of a session negotiation settlement signal, a session negotiation rejection signal, a session negotiation settlement signal, and an acknowledgment (ACK) signal are shown in FIG. 6.

FIG. 7 is a diagram illustrating message specifications for data synchronization according to an exemplary embodiment of the present disclosure.

As shown in FIG. 7, message specifications include session message specifications 710, data message specifications 720, synchronization message specifications 730, and endpoint message specifications 740.

Details of the session message specifications 710, the data message specifications 720, the synchronization message specifications 730, and the endpoint message specifications 740 are as shown in FIG. 7.

FIG. 8 is a flowchart illustrating a session negotiation process in a transmitter according to an exemplary embodiment of the present disclosure.

Logic for a session negotiation transmitter of a data synchronization session negotiation module to determine whether additional session interworking is possible by comparing the limited maximum number of sessions with the number of currently interworking sessions and transmit a session negotiation request to a data hub in a session negotiation candidate list will be described below.

As shown in FIG. 8, when the number of sessions is less than the maximum number of sessions (S810), a data hub is selected from among session negotiation candidates (S820).

When the number of sessions is the maximum number of sessions or more (S810), the logic ends.

When a selected value is NULL, the logic ends.

A session negotiation request signal is transmitted to the data hub (S830).

When the session negotiation is settled, a session module is generated (S840).

When the session negotiation is rejected, the logic returns to operation S810.

The session module is caused to interwork (S850). After that, the logic returns to operation S810.

FIG. 9 is a flowchart illustrating a session negotiation process in a receiver according to an exemplary embodiment of the present disclosure.

FIG. 9 illustrates logic for determining, with regard to a session negotiation request received by a session negotiation receiver of a data synchronization session negotiation module, whether additional session interworking is possible by comparing the limited maximum number of sessions with the number of currently interworking sessions and then, when additional session interworking is possible, negotiating whether session interworking for data synchronization is possible by comparing data domain information and interworking environment information issued between data hubs.

When a session negotiating request signal is received, the number of sessions is checked (S910).

When the number of sessions is less than the maximum number of sessions (S920), it is determined whether an interworking environment session negotiation is possible (S930).

When the number of sessions is the maximum number of sessions or more (S920), a session negotiation rejection signal is transmitted (S960).

When an interworking environment session negotiation is possible (S930), a session module is generated (S940).

When an interworking environment session negotiation is impossible (S930), a session negotiation rejection signal is transmitted (S960).

A session negotiation settlement signal is transmitted to a first data hub (S950).

Figure 10:
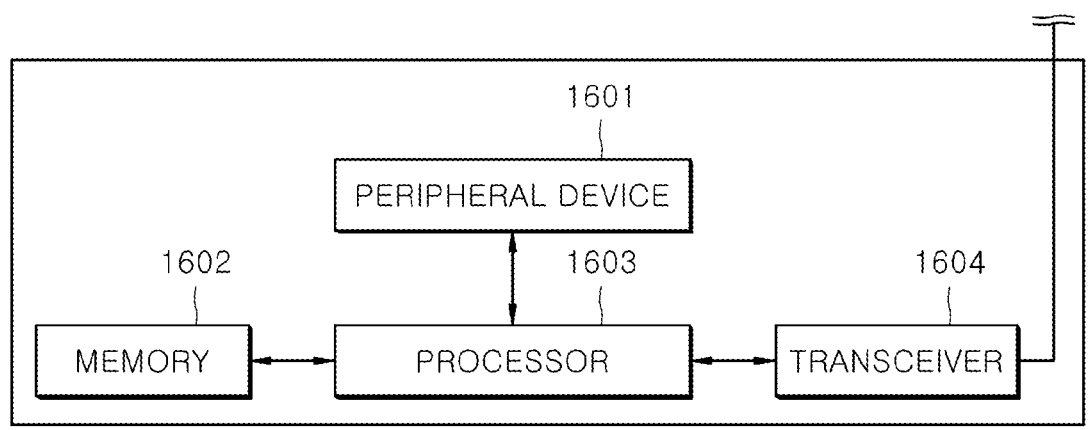
FIG. 10 is a block diagram of a device for synchronizing data in real time between data hubs according to an exemplary embodiment of the present disclosure.

FIG. 10 is a block diagram of a device for synchronizing data in real time between data hubs according to an exemplary embodiment of the present disclosure.

The data synchronization session negotiation module 100 of FIG. 2 according to an exemplary embodiment may be a device 1600. Referring to FIG. 10, the device 1600 may include a memory 1602, a processor 1603, a transceiver 1604, and a peripheral device 1601. Also, the device 1600 may additionally include other elements and is not limited to the above-described embodiment.

More specifically, the device 1600 of FIG. 10 may be an exemplary hardware/software architecture such as a device for synchronizing data in real time between data hubs. As an example, the memory 1602 may be a non-removable memory or a removable memory. Also, the peripheral device 1601 may include, for example, a display, a Global Positioning System (GPS) device, or other peripheral devices and is not limited to the above-described embodiment.

Further, the above-described device 1600 may include a communication circuit, such as the transceiver 1604, and may communicate with an external device on the basis of the communication circuit.

As an example, the processor 1603 may be at least one of a general processor, a digital signal processor (DSP), a DSP core, a controller, a microcontroller, application-specific integrated circuits (ASICs), field programmable gate arrays (FPGAs), different types of arbitrary integrated circuits (ICs), and one or more microprocessors related to a state machine. In other words, the processor 1603 may be a hardware/software element for controlling the above-described device 1600.

Here, the processor 1603 may execute computer-executable instructions stored in the memory 1602 to perform various necessary functions of the device for synchronizing data in real time between data hubs. For example, the processor 1603 may control at least one of signal coding, data processing, power control, input/output processing, and communication operations. Also, the processor 1603 may control the physical layer, the media access control (MAC) layer, and the application layer. Further, the processor 1603 may perform authentication and security procedures in an access layer, the application layer, etc. and is not limited to the above-described embodiment.

For example, the processor 1603 may communicate with other devices through the transceiver 1604. As an example, the processor 1603 may perform control by executing computer-executable instructions so that the device for synchronizing data in real time between data hubs communicates with other devices through a network. In other words, communication performed in the present disclosure can be controlled. For example, the transceiver 1604 may transmit a radio frequency (RF) signal through an antenna and transmit a signal on the basis of various communication networks.

As an antenna technology, for example, multiple-input and multiple-output (MIMO), beamforming, etc. may be applied. Also, a signal transmitted or received through the transceiver 1604 may be modulated or demodulated and then controlled by the processor 1603 and is not limited to the above-described exemplary embodiment.

According to an exemplary embodiment of the present disclosure, communication traffic required for ensuring real-time data is reduced. Also, a change that is most recently transmitted through a session is recorded, and thus only data that is additionally changed thereafter is transmitted so that a reduction in the amount of communication processing can be expected. Accordingly, it is possible to improve convenience for a user.

According to an exemplary embodiment of the present disclosure, when domain lists and information on user's data domains of interest are exchanged between data hubs using a synchronization session negotiation protocol and message specifications thereof and interworking environment information, such as data catalog syntax and supported transmission interfaces, is negotiated using the same, it is possible to easily detect which data hub issues desired data and has the same interworking environment. Accordingly, it is possible to improve convenience for a user.

Effects which can be achieved in the present disclosure are not limited to those described above, and other effects which have not been described will be clearly understood by those of ordinary skill in the art from the above description.

Various embodiments of the present disclosure are not intended to be all inclusive and are intended to illustrate representative aspects of the present disclosure. Features described in the various embodiments may be applied independently or in a combination of two or more thereof.

In addition, various embodiments of the present disclosure may be implemented by hardware, firmware, software, or a combination thereof. In the case of hardware implementation, one or more ASICs, DSPs, digital signal processing devices (DSPDs), programmable logic devices (PLDs), FPGAs, general processors, controllers, microcontrollers, microprocessors, etc. may be used for implementation. For example, embodiments of the present disclosure may be implemented in the form of a program stored in a non-transitory computer-readable medium that can be used at a terminal or edge or in the form of a program stored in a non-transitory computer-readable medium that can be used at an edge or cloud. Also, embodiments of the present disclosure may be implemented as a combination of various pieces of hardware and software.

The scope of the present disclosure includes software or machine-executable instructions (e.g., an operating system (OS), an application, firmware, a program, etc.) that enable operations according to methods of various embodiments to be performed on a device or computer, and a non-transitory computer-readable medium in which such software or instructions are stored and executable on a device or computer.

Various substitutions, modifications, and alterations can be made from the present disclosure described above by those of ordinary skill in the technical field to which the present disclosure pertains without departing from the technical spirit of the present disclosure. Therefore, the scope of the present disclosure is not limited to the above-described embodiments or the accompanying drawings.

What is claimed is:

1. A method of synchronizing data between data hubs in real time by a first data hub, the method comprising:
   verifying a session interworking environment;
   deriving session negotiation candidates;
   generating a session negotiation protocol message;
   transmitting a session negotiation request signal including the generated session negotiation protocol message to a second data hub;
   receiving a session negotiation settlement signal corresponding to the session negotiation request signal from the second data hub;
   generating a session module on the basis of the session negotiation settlement signal; and
   transmitting a session negotiation settlement signal to the second data hub.

2. The method of claim 1, further comprising receiving a session negotiation rejection signal from the second data hub.

3. The method of claim 1, wherein the generating of the session negotiation protocol message further comprises generating the session negotiation protocol message on the basis of at least one of domain list information, data catalog syntax, synchronization intervals, and interworking environment information of a supported transmission interface.

4. The method of claim 1, further comprising:
   when a number of sessions is less than a maximum number of sessions, selecting a data hub from among the session negotiation candidates; and
   transmitting the session negotiation request signal to the data hub.

5. The method of claim 1, further comprising:
   when the session negotiation request signal is received, checking a number of sessions;
   when the number of sessions is less than a maximum number of sessions, determining whether an interworking environment session negotiation is possible;
   when an interworking environment session negotiation is possible, generating a session module; and
   transmitting the session negotiation settlement signal to the first data hub.

6. The method of claim 1, further comprising:
   running a synchronization session server; and
   managing session interworking and session information.

7. The method of claim 6, further comprising managing the session interworking and the session information using an endpoint of a session module of the second data hub.

8. The method of claim 1, further comprising:
   when a data change is detected, extracting changed data; and
   transmitting the changed data to the second data hub at synchronization intervals.

9. The method of claim 8, further comprising extracting only a changed part of most recently transmitted data using session information.

10. The method of claim 1, wherein the session negotiation request signal includes a header part and a body part, the header part includes an authentication key, and the body part includes session message specifications, data message specifications, and synchronization message specifications.

11. A device for synchronizing data between data hubs in real time, the device comprising:
    a session negotiation environment verifier configured to verify a session interworking environment between a first data hub and a second data hub;
    a session negotiation candidate manager configured to derive session negotiation candidates; and
    a session negotiation request transmitter configured to generate a session negotiation protocol message, transmit a session negotiation request signal including the generated session negotiation protocol message to the second data hub, receive a session negotiation settlement signal corresponding to the session negotiation request signal from the second data hub, generate a session module on the basis of the session negotiation settlement signal, and transmit a session negotiation settlement signal to the second data hub.

12. The device of claim 11, wherein the session negotiation request transmitter receives a session negotiation rejection signal from the second data hub.

13. The device of claim 11, wherein the session negotiation request transmitter generates the session negotiation protocol message on the basis of at least one of domain list information, data catalog syntax, synchronization intervals, and interworking environment information of a supported transmission interface.

14. The device of claim 11, wherein, when a number of sessions is less than a maximum number of sessions, the session negotiation request transmitter selects a data hub from among the session negotiation candidates and transmits the session negotiation request signal to the data hub.

15. The device of claim 11, wherein a session negotiation request transmitter checks a number of sessions when the session negotiation request signal is received, determines whether an interworking environment session negotiation is possible when the number of sessions is less than a maximum number of sessions, and generates a session module and transmits the session negotiation settlement signal to the first data hub when the interworking environment session negotiation is possible.

16. The device of claim 11, wherein the session negotiation request transmitter runs a synchronization session server and manages session interworking and session information.

17. The device of claim 16, wherein the session negotiation request transmitter manages the session interworking and the session information using an endpoint of a session module of the second data hub.

18. The device of claim 11, wherein, when a data change is detected, the session negotiation request transmitter extracts changed data and transmits the changed data to the second data hub at synchronization intervals.

19. The device of claim 18, wherein the session negotiation request transmitter extracts only a changed part of most recently transmitted data using session information.

20. A device for synchronizing data between data hubs in real time, the device comprising:
- a transceiver configured to transmit and receive data to and from an external device; and
- a processor configured to verify a session interworking environment between a first data hub and a second data hub, derive session negotiation candidates, generate a session negotiation protocol message, transmit a session negotiation request signal including the generated session negotiation protocol message to the second data hub through the transceiver, receive a session negotiation settlement signal corresponding to the session negotiation request signal from the second data hub, generate a session module on the basis of the session negotiation settlement signal, and transmit a session negotiation settlement signal to the second data hub.

* * * * *